United States Patent [19]

Kikkawa et al.

[11] Patent Number: 5,741,145
[45] Date of Patent: Apr. 21, 1998

[54] LOCKING MECHANISM FOR AN ELECTRICAL CONNECTING DEVICE

[75] Inventors: Tomoyoshi Kikkawa; Tetsurou Muramatsu; Hiromi Masuda, all of Shizuoka-ken, Japan

[73] Assignee: Yazaki Corporation, Tokyo, Japan

[21] Appl. No.: 646,858

[22] Filed: May 8, 1996

[30] Foreign Application Priority Data

May 11, 1995 [JP] Japan .................. 7-113136

[51] Int. Cl.⁶ .................................................. H01R 35/04
[52] U.S. Cl. .................................................. 439/164; 439/15
[58] Field of Search .................................. 439/164, 15

[56] References Cited

U.S. PATENT DOCUMENTS

| | | | |
|---|---|---|---|
| 5,257,943 | 11/1993 | Ueno et al. | 439/164 |
| 5,450,769 | 9/1995 | Hu et al. | 439/164 |
| 5,460,535 | 10/1995 | Bolen | 439/164 |
| 5,662,486 | 9/1997 | Kato et al. | 439/164 |
| 5,674,081 | 10/1997 | Hoffmann et al. | 439/164 |

FOREIGN PATENT DOCUMENTS 6-47882  7/1990  Japan .

*Primary Examiner*—Gary F. Paumen
*Attorney, Agent, or Firm*—Finnegan, Henderson, Farabow, Garrett & Dunner, L.L.P.

[57] ABSTRACT

A locking member is provided for properly locking an electrical device turning member and fixed member together. The locking member includes an elastic engaging piece and an elastic touching piece. The elastic engaging piece engages an in-hole projection of an engaging hole of the turning member upon insertion of the locking member into the engaging hole. The locking member elastic touching piece contacts the inside wall of the engaging hole upon insertion of the locking member into the engaging hole. The locking member further includes a latching part for engaging a latching projection of the fixed member. The elastic engaging piece and elastic touching piece both provide for sway prevention of the locking member within the engaging hole, and securely lock the locking member within the hole.

20 Claims, 5 Drawing Sheets

LOCKING MECHANISM FOR AN ELECTRICAL CONNECTING DEVICE

BACKGROUND OF THE INVENTION

1. Field of the Invention

The present invention relates to a locking mechanism for an electrical connecting device for properly positioning a turning member with a fixed member and securing them together in a proper position. The locking mechanism is used in an electrical connecting device for electrically connecting the turning member and the fixed member with each other so as to transfer electric signals. Such an electrical connecting device is utilized, for example, in a steering mechanism of a vehicle between a turning member of a steering wheel and a fixed member of the steering column.

2. Description of the Related Art

An example of an electrical connecting device using a locking mechanism has been disclosed in Japanese Utility Model Application Publication No. 6-47882 to KOKAI ('882).

The electrical connecting device of '822 includes a fixed member and a turning member mounted to freely turn on the fixed member, the two members being electrically connected with each other through a flexible flat cable (not illustrated). When utilizing such a device in a steering mechanism of a car, it is necessary to mount the electrical connecting device so that the turning member may turn to a nearly equal degree in both directions from a neutral steering wheel position.

Before the turning member and fixed member are assembled into a specified device, it is necessary to secure the turning member in the neutral position in relation to the fixed member. Such a securing is provided by a locking mechanism having a locking member as a main component.

The locking member of '882 is molded of synthetic resins into a one piece member including an engaging part and an engaging piece joined with the engaging part through a reduced section. The reduced section allows for easy separation of the engaging part and engaging piece. The locking mechanism further includes a ring-shaped finger hook formed on a top portion of the engaging piece.

The engaging part of '882 further includes a lid in the shape of a flat-plate and a pair of U-shaped elastic pieces extending perpendicular from the lower face of the lid. The engaging piece protrudes from the reduced section in a direction parallel with the plane of the lid. The locking member can lock the turning member in the neutral position, so as not to turn in relation to the fixed member, by way of the engaging piece engaging a notch formed in the fixed member and securing the engaging part in a slot formed in the turning member. The slot in the turning member extends from the turning member upper face to an internal space within the turning member. The engaging piece is secured in the notch by inserting and fixing the engaging part in the slot. The engaging part is fixed within the turning member so that the upper plate of the turning member is located between the lid, whose lower face touches the upper plate of the turning member, and the pair of elastic pieces. The elastic pieces narrow as they initially pass into the slot and expand after passing through the upper plate of the turning member.

Such a locking mechanism having the locking member of '882 can hold the turning member in the neutral position until immediately before assembling the electrical connecting device into a steering unit and the like. The engaging part is prevented from slipping from the slot by securing the engaging part such that the upper plate of the turning member is located between the lid and the elastic pieces.

After the electrical connecting device having the locking mechanism of '882 has been assembled into its specified equipment, such as a vehicle steering unit, the locking mechanism can unlock the turning member from its locked state by disengaging the engaging piece from the notch. This is achieved by forcibly separating the finger hook and the engaging piece from the lid at the reduced section. During such an unlocked state of the turning member, the engaging part of the locking member remains secured within the slot with the upper plate of the turning member located between the lid and the elastic pieces. Because both the locking member in a locked state, and the remaining engaging part in an unlocked state, are held in the electrical connecting device with the upper plate of the turning member between the lid and the elastic pieces of the engaging part, a problem exists when a force in parallel with the upper plate of the turning member is applied to the locking mechanism. Such a force may displace the locking mechanism in the direction of the force and possibly slip the engaging part out from the slot. Such a possible occurrence reduces the reliability of the device.

It is important to mount the locking member so that it cannot be removed from the slot, thus keeping the device in a locked state after mounting the locking member.

If the locking member mounted in a locked state can easily be removed due to carelessness, mischief of a worker, or an unexpected load during storage, transportation, and the like, not only is the neutral position lost by allowing rotation of the turning member, but also there is a possibility of positioning the locking member in the wrong neutral position upon reengaging the locking mechanism. Therefore, removability of the locking member results in decreased reliability of locking the turning member in a neutral position.

In an unlocked state, the remaining engaging part needs to be located inside the engaging hole such that it cannot be removed. Easy removal of the remaining engaging part from the engaging hole allows for resetting the locking member into the empty engaging hole with a possibility of positioning the turning member in a wrong neutral position at the time of this resetting. Such repositioning can result in a deteriorated reliability of the neutral position of the turning member.

Locking mechanisms of the prior art have also been designed with the slot of the turning member narrow in width in order to prevent removal of both the locking member in a locked state and the remaining engaging part in an unlocked state. With such a formation it is difficult to design a securing arrangement which does not include a gap between the upper plate of the turning member and the top of the elastic pieces after the engaging part of the locking mechanism has been inserted into the slot. Such a gap reduces the quality of the device by allowing the remaining engaging part to produce a rattling noise.

SUMMARY OF THE INVENTION

The present invention solves the above-mentioned problems. Therefore, an object of the present invention includes providing a more reliable locking mechanism for an electrical connecting device which does not create abnormal rattling noises and securely locks the turning member in a neutral position.

In order to attain the above-mentioned objects, the invention provides a locking mechanism for an electrical connecting device in which a fixed member and a turning member mounted on the fixed member to freely turn are connected with each other through a flexible flat cable. The locking mechanism locks the turning member by way of a locking member having an engaging part which is inserted and held in an engaging hole provided in either the fixed member or the turning member, and a latching part which engages the other of the fixed or turning member. The locking mechanism is released from a locked state by separating the latching part from the engaging part. The latching part is formed into one body with the engaging part such that it can be separated from the engaging part. The latching part further protrudes outside the engaging hole where it engages with the other of the turning member and the fixed member. The engaging part includes a sway preventing means for preventing the engaging part from swaying in the engaging hole, while in a locked or unlocked state, and a slip-off preventing portion for engaging the engaging hole.

The locking mechanism sway preventing means includes an elastic piece which engages the inside wall of the engaging hole, the elastic piece including a force-insertion portion on sides of the elastic piece for making it possible to insert the elastic piece into the engaging hole. The slip-off preventing means includes an engaging piece for engaging the inside wall of the engaging hole.

The locking mechanism further includes an opening extending from the engaging hole for allowing visual inspection of the engaging hole from an external side of one of the turning member or fixed member.

A locking member notch forms a point of division during separation of the engaging part and the latching part. The trigger is formed where the engaging part and the latching part are joined and is within the engaging hole after insertion of the engaging part within the engaging hole.

The locking mechanism slip-off preventing means and sway preventing means securely prevent the locking member from slipping from the device after mounting in the engaging hole. Once the locking member is in a locking state, the locked state cannot be unlocked as long as the latching part and the engaging part are not separated. The locking mechanism secures the turning member in a locked state in its neutral position until assembly of the electrical connecting device into specified equipment.

Furthermore, after separating the latching part and the engaging part of the locking mechanism, the engaging part remains securely held without play inside the engaging hole by way of the sway preventing means and the slip-off preventing means. Such an arrangement assures that an unintentional or deliberate separating force upon the engaging part does not occur during assembly of the electrical connecting device into specified equipment. With this configuration, the locking member cannot be removed and reinserted incorrectly.

The elastic touching piece contacts the inside wall of the engaging hole by way of its biasing force created by insertion into the engaging hole. The edges of the elastic touching piece are formed so as to easily insert into the engaging hole.

The sway preventing member therefore includes a force-insertion portion to be inserted into the engaging hole and pressed against the inside wall thereof to stop swaying of the engaging part.

Either the engaging part or the inside wall of the engaging hole is formed of an elastic material and the other is formed of a rigid material. With such a configuration the engaging part smoothly engages the engaging hole because of the biasing of the elastic material. The engaging part and the engaging hole are easily engaged by a convex part formed in either the engaging part or the inside wall of the engaging hole and a concave part formed in the other of the engaging part and inside wall.

The engaging hole also connects with an opening through an external side of either the turning part or the fixed part. The existence of the engaging part inside the engaging hole can be verified through this opening.

Furthermore, a notch in the locking member makes a trigger point of division when separating the engaging part and the latching part. The locking mechanism is separated when a force is applied in a specific direction. Therefore, after mounting the locking member it is possible to prevent an unintentional separation, and since the notch is formed so as to be located within the engaging hole after insertion of the engaging part in the engaging hole, the break face of the locking mechanism does not protrude from the surface of the turning member after the separation.

DESCRIPTION OF THE PREFERRED EMBODIMENTS

Figure 1:
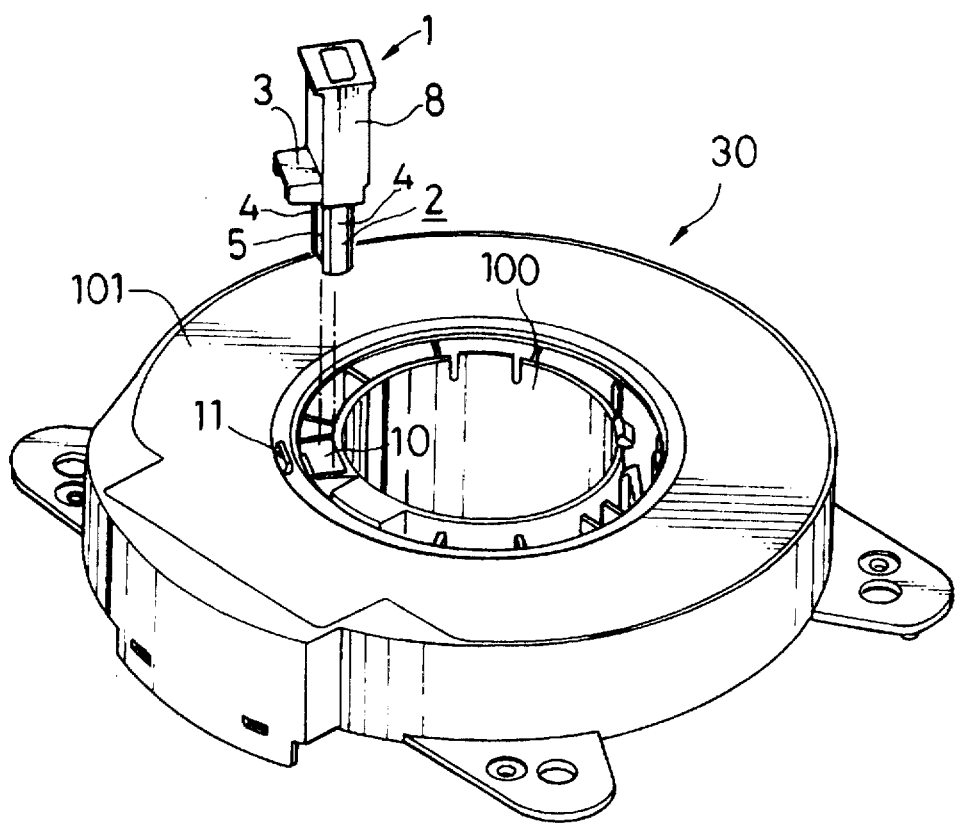
FIG. 1 is a perspective view of an electrical connecting device partially disassembled including a first locking mechanism according to a first embodiment of the invention.

The present invention is described by the following illustrated embodiments. An electrical connecting device 30 is provided with a first locking mechanism as a first embodiment of the invention. The electrical connecting device 30 functions, similar to the disclosed prior art, to electrically connect a fixed member 101 and a turning member 100 mounted on the fixed member 101 so that the turning member may freely turn through a flexible flat cable (not illustrated).

The locking mechanism according to the first embodiment includes an engaging hole 10 opening on the upper face of the circumferential wall of the turning member 100 and a latching projection 11 formed on a part of the inner circumferential wall of the fixed member 101. A locking member 1 is provided with an engaging part 2 for insertion into and securing within the engaging hole 10. The locking member 1 further includes a latching part 3 which is formed together with the engaging part 2 such that it may be separated from the engaging part 2. The latching part engages the latching projection 11 of the fixed member.

The engaging hole 10 is formed of a square cylinder having its circumferential wall inside the circumferential wall of the turning member 100. The latching projection 11 is formed on the fixed member 101 a distance from the inner circumferential wall of the fixed member 101 and opposite the engaging hole 10 when the turning member 100 is in a neutral position.

Figure 2:
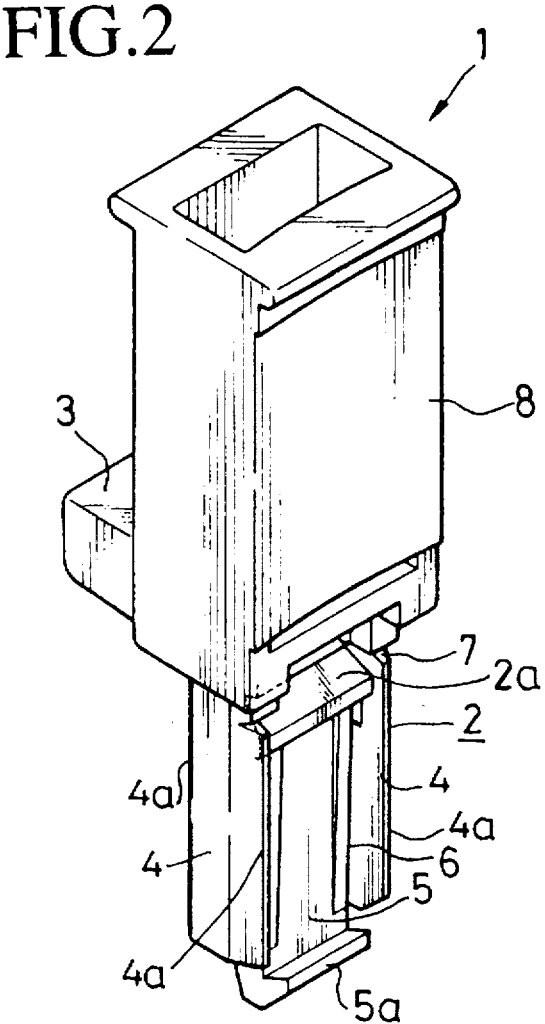
FIG. 2 is a perspective view of the locking member used in the locking mechanism according to the first embodiment.
Figure 3:
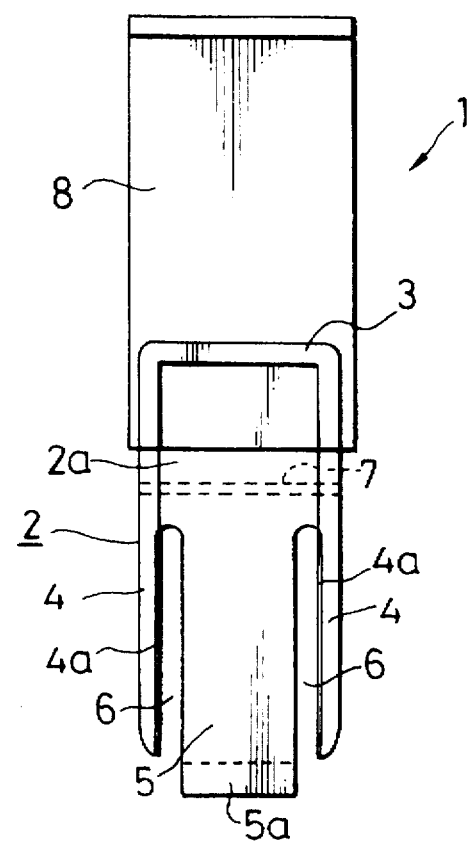
FIG. 3 is a front view of the locking member of FIG. 2.

As shown in FIGS. 2 and 3, the locking member 1 includes a handling part 8 of a square cylinder in shape, an engaging part 2 extending perpendicularly from a lower face of the handling part and, a latching part 3 protruding sideways from a lower part of the handling part 8. A notch 7 designed to be a trigger of separation is provided at a base 2a of the engaging part 2 to separate the engaging part 2 from the latching part 3.

The engaging part 2 is located below the notch 7 and includes an elastic engaging piece 5 as a slip-off preventing means extending down from the middle of the engaging part 2. The slip-off preventing means includes a hook 5a at a lower end. Elastic touching pieces 4 forming a sway preventing means extend down both sides of the engaging part 2 and are spaced from the slip-off preventing means by slits 6 on both sides of the elastic engaging piece 5. Elastic touching pieces 4 are bendable adjacent the elastic engaging piece 5, and its preferable to form them so that both sides have thin edges 4a as shown in FIG. 3.

The latching part 3 is formed into a groove having a downwardly open U-shaped cross section. And the locking member 1, including the engaging part 2, the latching piece 3, and the handling part 8, is molded from a synthetic resin as one body.

Figure 4A:
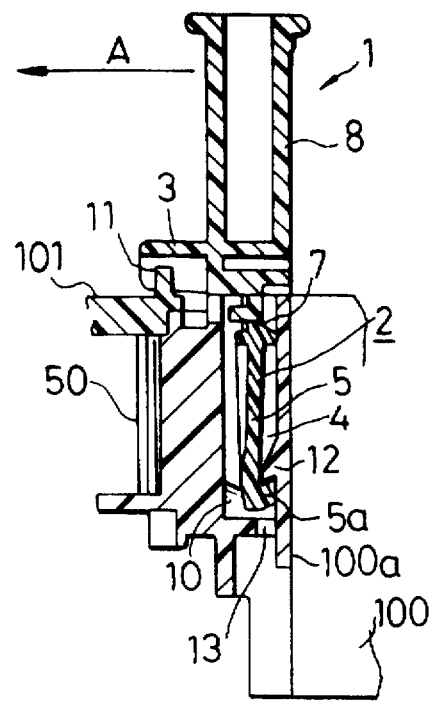
FIG. 4A is a side cross-sectional view of the locking member of FIG. 2.
Figure 4B:
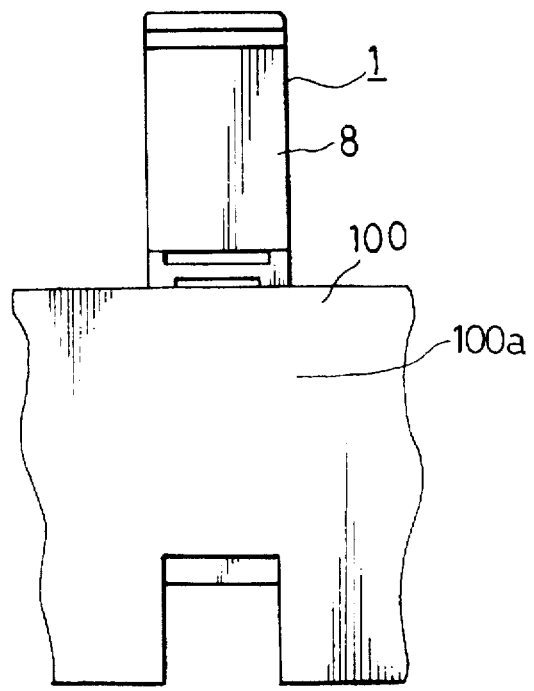
FIG. 4B is a back view of the locking member inserted in the turning member according to the first embodiment.

Furthermore, the engaging hole 10 as shown in FIGS. 4A and 4B includes an in-hole projection 12 formed on an inside wall of the inner circumferential wall 100a. An opening 13 through which the inside of the engaging hole 10 can be seen from a lower face of the electrical connecting device 30 is formed through the bottom wall of the engaging hole 10. A flat cable 50 is wound on the outer circumferential wall of the turning member 100.

The first locking mechanism can be set in a locked state in the following manner. The turning member 100 is initially located in the neutral position relative to the fixed member 101. At this point, the latching projection 11 and the engaging hole 10 are aligned with each other (see FIG. 1 ). The locking member 1 is then inserted into the engaging hole 10 so that the latching part 3 engages the latching projection 11.

As shown in FIG. 4A, the locking member 1 is second in the engaging hole 10 by engaging the hook 5a of the elastic engaging piece 5 with the in-hole projection 12. The elastic touching pieces 4 suppress sway of the locking member by elastically contacting the inside wall of the engaging hole 10. With this configuration, the latching part 3 engages the latching projection 11. In this manner, a locked state occurs in which the turning member 100 is restricted from turning relative to the fixed member 101.

In the locked state, it is possible to hold the turning member 100 in the neutral position until assembly of the device 30 into specified equipment, therefore improving the reliability of the locking mechanism.

The engaging part 2 and the latching part 3 of the locking member are separated from each other at notch 7. The notch 7 of the present invention is different from the separating means of the prior art. The prior art separates the locking member at a reduced section. The present invention requires a separation force in a specific direction (a force in the direction of A or opposite to A in FIG. 4A), therefore reducing unwanted separation during transportation or storage.

Furthermore, because the elastic touching pieces 4 are provided with the edges 4a, even if the engaging hole 10 is more narrow in width than the extent of the elastic touching pieces 4, the engaging part 2 can be easily inserted into the engaging hole 10 due to a force-insertion effect of the edges 4a. The forced insertion also provides for a secures the engaging part 2 inside the engaging hole 10 in a stable manner.

This locking mechanism is unlocked in the following manner. As shown in FIG. 4A, when a force in a direction along A, nearly parallel with the upper face of the turning member 100, is applied to the handling part 8 of the locking member 1, the latching part 3 and the engaging part 2 can be separated from each other at the notch 7. An engagement of the turning member 100 and the fixed member 101 is lost by this separation, and an unlocked state (shown in FIG. 5) is attained.

In the unlocked state, the remaining engaging part 2 inside the engaging hole 10 after separation is held inside the engaging hole 10 without sway due to the elastic touching pieces 4 which elastically contact the inside wall of the hole 10. The tight fit of the remaining engaging part reduces any abnormal noise, thereby improving the quality of the locking mechanism.

The remaining engaging part 2 is secured within the engaging hole 10 by hook 5a engaging the in-hole projection 12, and therefore the engaging part is prevented from coming out of the engaging hole 10. Any problems associated with remounting the locking member 1 out of the neutral position are prevented.

Furthermore, since the opening 13 extends to the bottom wall of the engaging hole 10, it is possible to visually check whether or not the engaging part 2 is inside the engaging hole 10, and therefore whether the turning member is locked in the neutral position.

Figure 5:
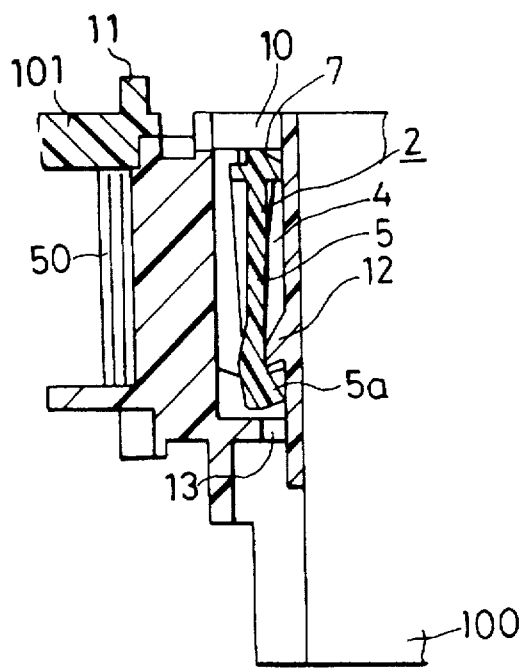
FIG. 5 is a cross-sectional view of the locking member of the first embodiment in an unlocked state.

The break face defined at the notch 7 is located within the engaging hole 10, as shown in FIG. 5. Therefore, a remaining projection caused by the separation does not protrude from the surface of the turning member 100, and safety after unlocking can be assured. The recessed break face does not provide for the problems associated with the prior art which includes a break face remaining on the outer circumference of the turning member 100 after unlocking.

Figure 6:
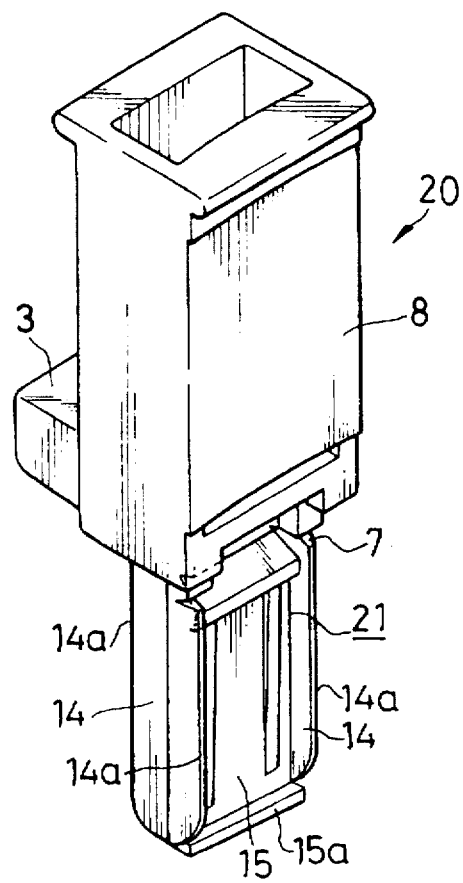
FIG. 6 is a perspective view of a locking member according to a second embodiment of the invention.
Figure 7:
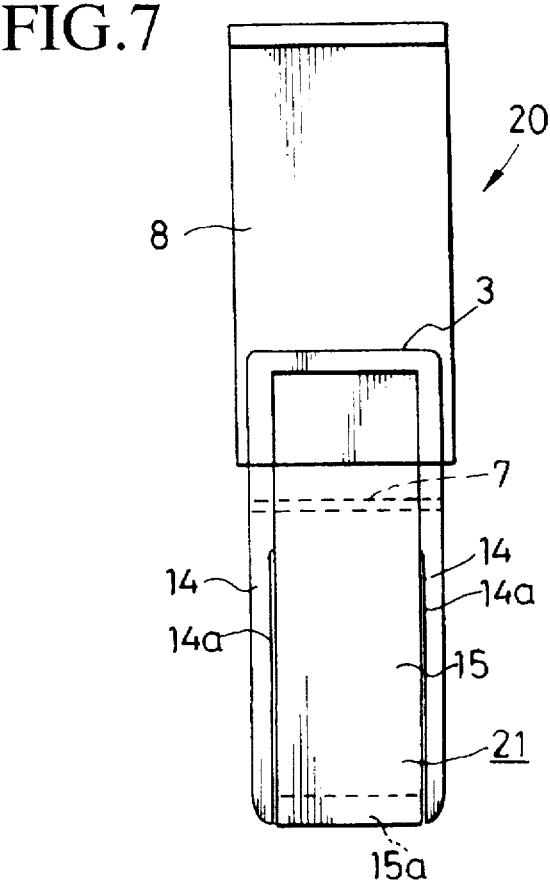
FIG. 7 is a front view of the locking member in accordance with the second embodiment.

FIGS. 6 and 7 show a locking member 20 composing a second locking mechanism according to a second embodiment of the invention. The locking member 20 of the second embodiment differs from that of the first embodiment in that an engaging part 21 extending below notch 7 includes a centralized engaging piece 15 formed as a slip-off preventing means. The slip-off preventing means includes a hook 15a at its lower end. Force-insertion pieces 14 form sway preventing means on both sides of the engaging piece 15. The other features of the locking member 20 include the same elements as the above-mentioned locking member 1. This engaging part 21 forms nearly an "H" cross-sectional shape by the centralized engaging piece 15 and the force-insertion pieces 14 provided on both sides of the engaging piece 15. The engaging part 21 forms a rigid structure in which the engaging piece 15 and the force-insertion pieces 14 reinforce each other. The force-insertion pieces 14 are formed into flat plates having thin edges 14a. The edges 14a allow forcible insertion of the engaging pieces 14 into the engaging hole 19 by pressing the pieces 14 against the inside wall of the engaging hole.

Figure 8A:
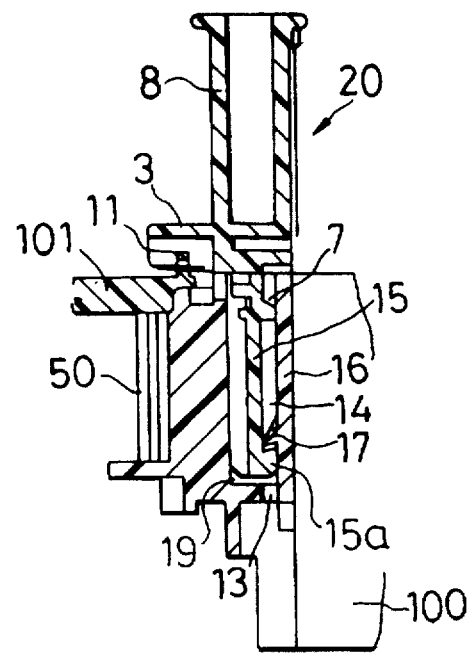
FIG. 8A is a side cross-sectional view of the locking member according to the second embodiment.
Figure 8B:
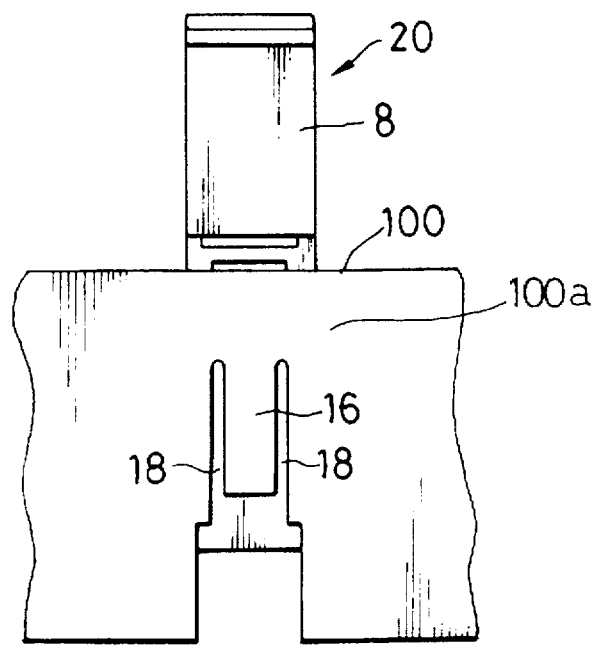
FIG. 8B is a back view of the locking member inserted into the turning member according to the second embodiment inserted into the turning member.

The engaging hole 19 shown in FIGS. 8A and 8B includes parallel slits 18 which are formed in the inner circumferential wall 100a of the turning member 100. The engagement hole 19 further includes an elastic wall part 16 formed between the slits 18 and an in-hole projection 17 formed in the in-hole side face of the elastic wall part 16. The elastic wall part 16 has a width narrower than the engaging piece 15 of the locking member 20.

In the locking mechanism according to the second embodiment, it is possible to mount the locking member 20 in a locked state by inserting the engaging part 21 into the engaging hole 19 by pressing the edges 14a of the force-insertion pieces 14 against the inside wall of the engaging hole 19.

In this locked state, the hook 15a of the engaging piece 15 prevents slip-off of the engaging piece 15 from the engaging hole 19 by engaging the in-hole projection 17. At the same time the engaging part 21 does not sway within the engaging hole 19 due to the force-insertion pieces 14 contacting the engaging hole 19 and pressing against the inside wall of the hole 19. Thus, the engaging piece 15 and in-hole projection 17 secure the engaging part 21 within the engaging hole 19 in a locked state. The locked state remains as long as the latching part 3 and the engaging part 21 are not separated from each other. The locking mechanism according to the second embodiment can therefore securely hold the turning member 100 in the proper neutral position until assembly of the device having such a mechanism.

The remaining engaging part 21 after separation is securely held without play inside the engaging hole 19 due to the force insertion of the force-insertion pieces 14 and engagement of the engaging piece 15 with the in-hole projection 17. Such a firm fit removes any abnormal noise caused by the remaining engaging part 21 during operation of the mechanism.

What is claimed is:

1. A locking mechanism for an electrical connecting device, comprising:

a fixed member;

a turning member freely turnable about said fixed member and electrically connected to said fixed member through a flexible flat cable; and a locking member including:

an engaging part insertable into an engaging hole in one of said fixed member and said turning member, said engaging part including a sway preventing means for substantially preventing the engaging part from swaying in said engaging hole, and a slip-off preventing means located adjacent said sway preventing means for lockingly engaging said engaging hole, and a latching part initially integral with said engaging part but separable from the engaging part, said latching part including a protruding part for engaging the other of said turning member and said fixed member when the engaging part is inserted in said engaging hole, said locking member unlocking said turning member by separating said latching part from said engaging part when said engaging part is inserted in said engaging hole.

2. A locking mechanism for an electrical connecting device as defined in claim 1, wherein said sway preventing means includes at least one elastic piece contacting an inside wall of said engaging hole.

3. A locking mechanism for an electrical connecting device as defined in claim 1, wherein said sway preventing means includes at least one force-insertion portion for guiding said engaging part into said engaging hole.

4. A locking mechanism for an electrical connecting device as defined in claim 1, wherein said sway preventing means includeds at least one elastic piece contacting an inside wall of said engaging hole, said at least one piece having edges for guiding insertion of said engaging part into said engaging hole.

5. A locking mechanism for an electrical connecting device as defined in claim 1, wherein said slip-off preventing means includes an engaging piece for lockingly engaging an inside wall of said engaging hole.

6. A locking mechanism for an electrical connecting device as defined in claim 1, wherein said engaging hole is connected to an opening through which the engaging hole can be seen from an external side of the locking mechanism.

7. A locking mechanism for an electrical connecting device as defined in claim 1, including a notch defining a trigger point of division when separating said engaging part and said latching part, said notch located on said locking member so that a remaining engaging part is completely located within the engaging hole.

8. A locking mechanism for an electrical connecting device, comprising:

a fixed member;

a turning member freely turnable about said fixed member and electrically connected said fixed member through a flexible flat cable; and a locking member including:

an engaging part insertable into an engaging hole in one of said fixed member and said turning member, said engaging part including a sway preventing means for substantially preventing the engaging part from swaying in said engaging hole, and a slip-off preventing means for lockingly engaging said engaging hole, a latching part initially integral with said engaging part but separable from the engaging part, said latching part including a protruding part for engaging the other of said turning member and said fixed member when the engaging part is inserted in said engaging hole, and a notch defining a separation point between said engaging part and said latching part, said notch located within said engaging hole after said engaging part is inserted in said engaging hole, said locking member unlocking said turning member by separating said latching part from said engaging part when said engaging part is inserted in said engaging hole.

9. A locking mechanism for an electrical connecting device as defined in claim 8, wherein said sway preventing means includes at least one elastic piece contacting an inside wall of said engaging hole.

10. A locking mechanism for an electrical connecting device as defined in claim 8, wherein said sway preventing means includes at least one force-insertion portion for guiding said engaging part into said engaging hole.

11. A locking mechanism for an electrical connecting device as defined in claim 8, wherein said sway preventing means includes at least one elastic piece for contacting an inside wall of said engaging hole, said piece having edges for guiding insertion of said engaging part into said engaging hole.

12. A locking mechanism for an electrical connecting device as defined in claim 8, wherein said slip-off preventing means includes an engaging piece for lockingly engaging an inside wall of said engaging hole.

13. A locking mechanism for an electrical connecting device as defined in claim 8, wherein said engaging hole is connected to an opening through which the engaging hole can be seen from an external side of the locking mechanism.

14. A locking mechanism for an electrical connecting device, comprising:

a fixed member;

a turning member freely turnable about said fixed member and electrically connected to said fixed member through a flexible flat cable; and a locking member including:

an engaging part insertable into an engaging hole in one of said fixed member and said turning member, said engaging part including a sway preventing means approximately contacting all sides of said engaging hole for substantially preventing the engaging part from swaying in said engaging hole, and a slip-off preventing means for lockingly engaging said engaging hole, and a latching part initially integral with said engaging part but separable from the engaging part, said latching part including a protruding part for engaging the other of said turning member and said fixed member when the engaging part is inserted in said engaging hole, said locking member unlocking said turning member by separating said latching part from said engaging part when said engaging part is inserted in said engaging hole.

15. A locking mechanism for an electrical connecting device as defined in claim 14, wherein said sway preventing means includes two elastic pieces, each approximately contacting three sides of said engaging hole.

16. A locking mechanism for an electrical connecting device as defined in claim 14, wherein said sway preventing means includes a force-insertion portion for guiding said engaging part into said engaging hole.

17. A locking mechanism for an electrical connecting device as defined in claim 14, wherein said sway preventing means includes two elastic pieces, each approximately contacting three sides of said engaging hole, said pieces having edges for guiding insertion of said engaging part into said engaging hole.

18. A locking mechanism for an electrical connecting device as defined in claim 14, wherein said slip-off preventing means includes an engaging piece for lockingly engaging an inside wall of said engaging hole.

19. A locking mechanism for an electrical connecting device as defined in claim 14, wherein said engaging hole is connected to an opening through which the engaging hole can be seen from an external side of the locking mechanism.

20. A locking mechanism for an electrical connecting device as defined in claim 14, including a notch defining a trigger point of division when separating said engaging part and said latching part, said notch located on said locking member so that a remaining engaging part is completely located within the engaging hole.

* * * * *